US008031380B2

(12) United States Patent
Patterson

(10) Patent No.: US 8,031,380 B2
(45) Date of Patent: Oct. 4, 2011

(54) FRONT FEED DOCUMENT IMAGING DEVICE INPUT TRAY

(75) Inventor: Peter Bruce Patterson, Ottawa (CA)

(73) Assignee: Visioneer, Inc., Pleasanton, CA (US)

( * ) Notice: Subject to any disclaimer, the term of this patent is extended or adjusted under 35 U.S.C. 154(b) by 866 days.

(21) Appl. No.: 12/077,810

(22) Filed: Mar. 21, 2008

(65) Prior Publication Data

US 2009/0237752 A1    Sep. 24, 2009

(51) Int. Cl.
*H04N 1/04* (2006.01)

(52) U.S. Cl. ......... 358/474; 358/496; 358/497; 358/498

(58) Field of Classification Search .................. 358/474, 358/496, 497, 498; 271/3.14, 162
See application file for complete search history.

(56) References Cited

U.S. PATENT DOCUMENTS

| 5,111,252 | A | * | 5/1992 | Hamada et al. | 399/393 |
| 6,053,493 | A | * | 4/2000 | Yokoyama et al. | 271/171 |
| 7,770,877 | B2 | * | 8/2010 | Hasegawa | 271/3.14 |

* cited by examiner

*Primary Examiner* — Houshang Safaipour

(57) ABSTRACT

The invention claimed is a novel front feed document imaging device input tray which accommodates varying types and widths of media by providing front feed capability in a single tray attachment, and which tray can pivot out of the way of the document path by virtue of torsion springs when the user wishes to alternate media types. The input tray may be locked into position depending upon the user's requirements.

11 Claims, 8 Drawing Sheets

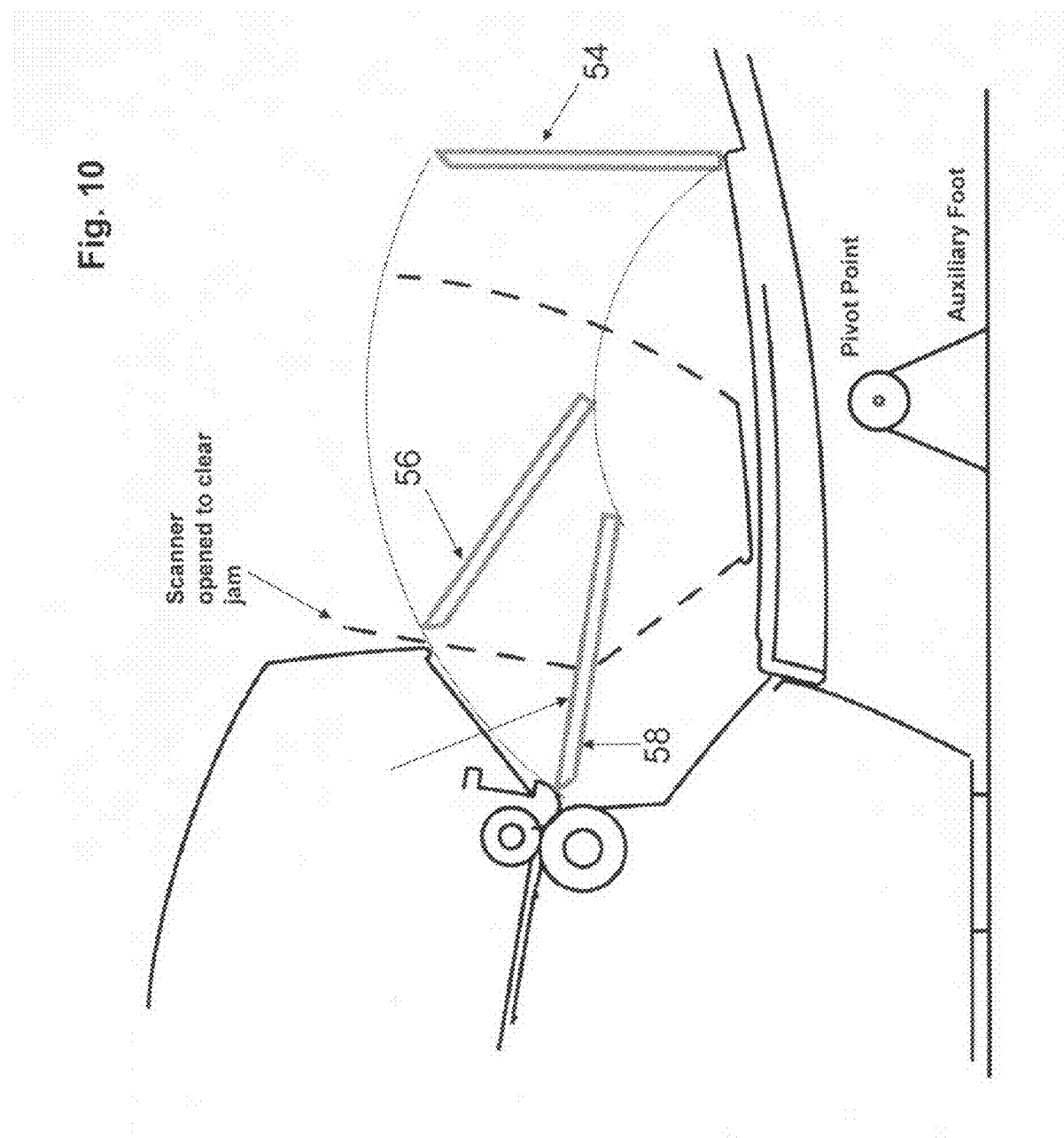

FRONT FEED DOCUMENT IMAGING DEVICE INPUT TRAY

FIELD

The invention relates to document imaging devices, and more particularly to a front feed input tray device which allows a user to scan multiple types of media via a front feed design which is moveable to clear the output path after use and allow normal ADF scanning without the need for secondary attachments.

BACKGROUND OF THE INVENTION

The invention most closely corresponds with USPTO Class 358, wherein the invention involves the communication or reproduction of a static image or sequence of static images in which the density variations composing the image do not vary with time (e.g., a document image) by a method or apparatus.

In its simplest form, the invention comprises a novel front feed document imaging device input tray which allows for varying types and widths of media by providing front feed capability in a single tray attachment, and which tray can pivot out of the way of the document path when the user wishes to alternate media types or perform maintenance on the imaging device. By way of example, this application will use a document scanner with an ADF (automatic document feed) for uniformity and clarity of explanation.

With current traditional document scanners, front feed devices are typically limited to a single function, i.e. user scans a sheet of paper and then affixes an alternate type of input attachment to accommodate a different size media. By way of example, to scan business cards, one type of input attachment is placed by a user and said user is required to remove the attachment to return to standard size media input device. The present invention provides a solution for both modalities within a single front feed attachment.

THE INVENTION

Summary, Objects and Advantages

Traditional document scanners that are said to be ADF or automatic document feeders have the input tray located at the top end of the scanner whereby pages are drawn through the scanner. This solution is not conducive to scanning media such as business cards, driver's licenses, or medical ID cards so serving both functions has historically required multiple pieces of hardware. Alternately, a user might have to remove the paper from the ADF, adjust paper guides to fit a medical ID card (by way of example), scan the card, re-adjust the paper guides, and return the standard paper into the ADF. Such a process is a cumbersome and inefficient solution.

The present invention offers an input tray which is located at the front end of the scanner (typically above the output tray in present scanners). The inventive tray is designed in two basic parts. A lower output portion (standard output paper tray), and an upper input portion whereby various media widths may be accommodated through the use of adjustable paper guides.

The lower portion is essentially a standard paper tray with certain modifications for functionality and practicality, and which will be described further herein. The upper portion of the tray will have an adjustable width mechanism (paper guides) to accept media such as business cards, medical ID cards, driver's licenses, etc., and which will adjust to fit an 8.5×11 inch sheet. Both portions reside in a single housing.

An obvious issue with such construction might be that one portion of the tray may interfere physically with the paper output path. That possibility is resolved by the design of the upper tray wherein it can pivot out of the way so as not impede the normal paper path when the scanner is used in ADF mode, and for ease of maintenance (removing paper jams, etc.). In "use" position, the tray aligns with the plane of the scan bed and is ready to allow paper feed-through. In "ready" position, the tray is clear of the output path and will self deploy to the maintenance position if the scanner is opened to clear a paper jam. In "maintenance position", the front feed platform pivots completely backward and away from the scanner as a cover would when opening the unit to clear a paper jam. This occurs either by a user pulling the tray away from the scanner with sufficient force to overcome a set of ramps or stops, or by the user simply opening the housing of the scanner causing the front feed tray to overcome the ramps or stops and move away from the front of the scanner to allow maintenance.

By way of example, a user wishes to scan a medical ID card in single use mode. The user places the card in the upper portion of the tray, and by pushing forward, pivots the upper tray into use position so that the card is in correct alignment to be front fed into the scan path. The tray will stop at a designed position so that it can pivot no further forward. At this point, the tray and media are aligned with the input feed path. Utilizing the Assignee's auto-launch feature, the document will be automatically drawn through the scanner as a result of a front feed sensor on the scanner which alerts the software that media is available and drawing occurs.

After the media is acquired by the scanner feed mechanism, the user releases the media and the scan will proceed. Then, the upper feed tray may be depressed back to ready position by virtue of torsion springs on the pivot axle, which automatically clears the output path for ADF functionality or device maintenance. A locking mechanism may be added to detain the tray in one position for extended scanning of card type media, and such locking mechanisms may include the torsion retention as above, or a form of clip mechanism to hold the tray in position.

An additional design element of the upper tray input paper guide or card slot provides for a scoop-shaped indentation formed at the front portion of the guide to facilitate card visibility and retrieval. While not vital to operation, such design increases ease of use by allowing for a clear view that media is present, and ease of removal.

Located beneath the front paper tray assembly is a footer section for added support of the tray. The footer essentially consists of a protruding piece (foot) which is connected to the existing tray via a ramp and axle with slot for spring retention. A pivot point connects to the upper tray portion (card media input tray) to allow for axis pivoting described above in [010]. The pivot arms include tensioning springs so as to retain an inward force without relying on the plastic housing alone, and to insure long term alignment and avoidance of warping.

BRIEF DESCRIPTION OF THE DRAWINGS

The invention is described in further detail by reference to the drawings in which:

FIG. 10 illustrates still motion capture of the tray as it may pivot between "use", "ready" and "maintenance" positions.

DETAILED DESCRIPTION, INCLUDING BEST MODES OF CARRYING OUT THE INVENTION

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in 9 relatively simple figures; although sufficiently complex as to illuminate to one skilled in the art of such scanner architecture, and calibration methods viable for making or using said invention.

Figure 1:
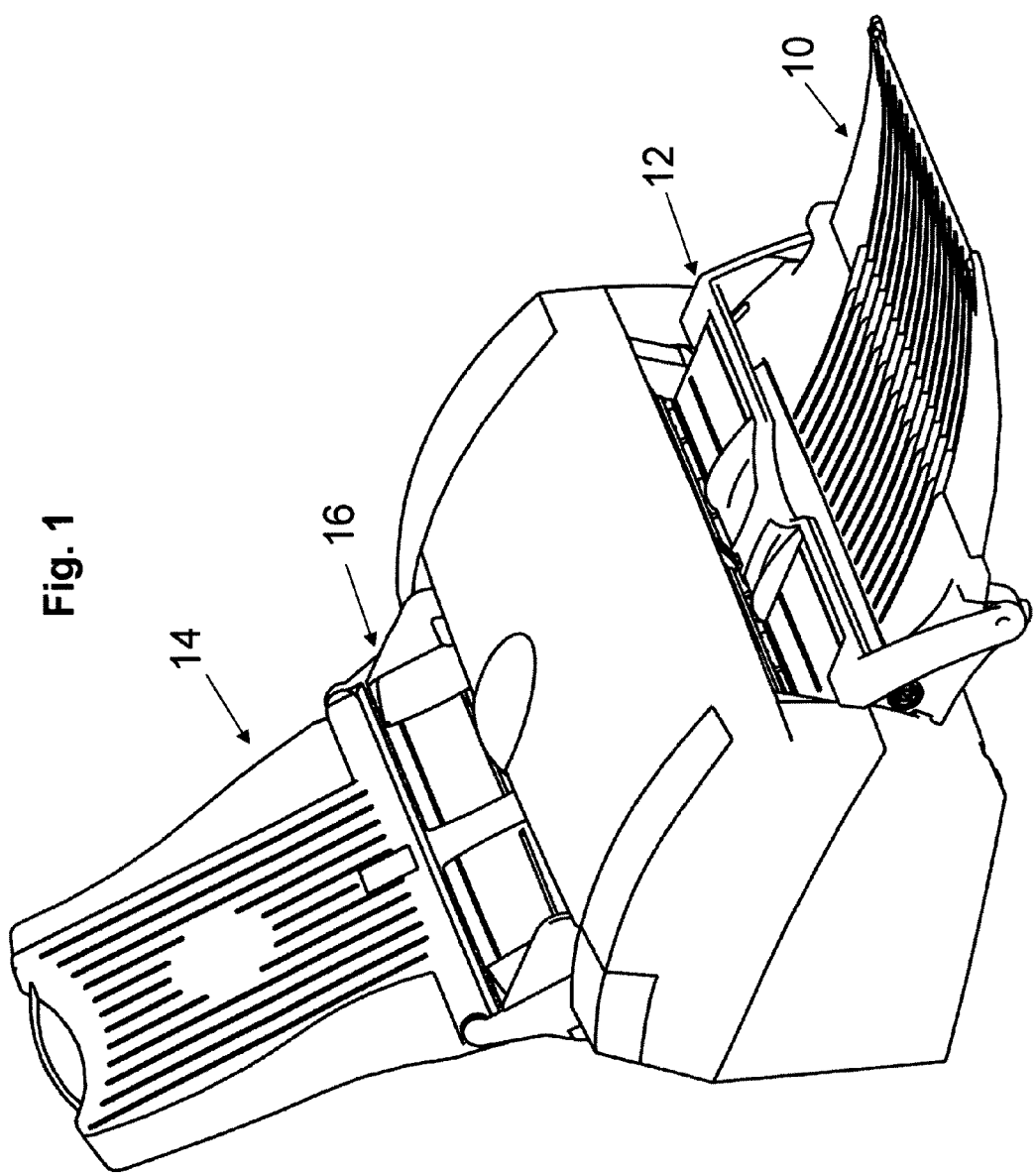
FIG. 1 is a full view of the scanner illustrating the input tray in the use position.

FIG. 1 illustrates the inventive apparatus in its entirety in a simple drawing. The standard output tray 10 is shown as it is connected to the input card or multi-media tray 12. This Figure is provided for an overall representation so as to generally illustrate at first glance the basic design of the scanner with the front feed tray. An ADF or automatic document feed tray 14 is shown as a standard portion of the inventive apparatus, and includes adjustable width media guides as customary to many industry ADF inputs.

Figure 2:
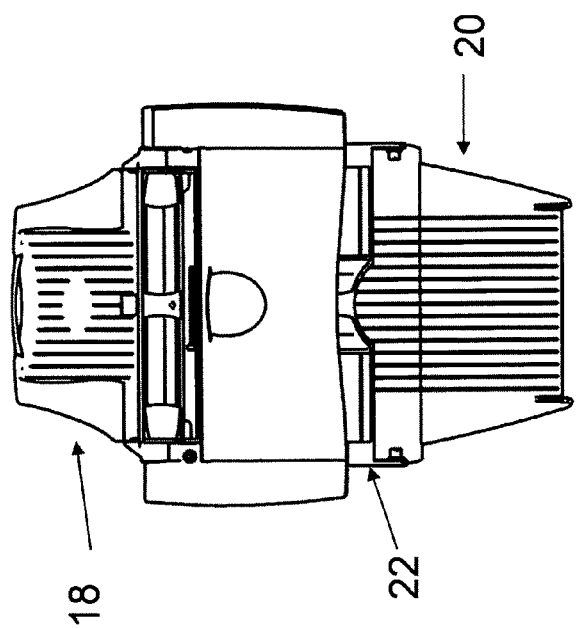
FIG. 2 is a top view of the scanner with the input tray in the use position.

FIG. 2 is a top view of the scanner showing the ADF 18, the output tray 20, and the pivoting front feed input 22. This Figure is fairly self explanatory.

Figure 3:
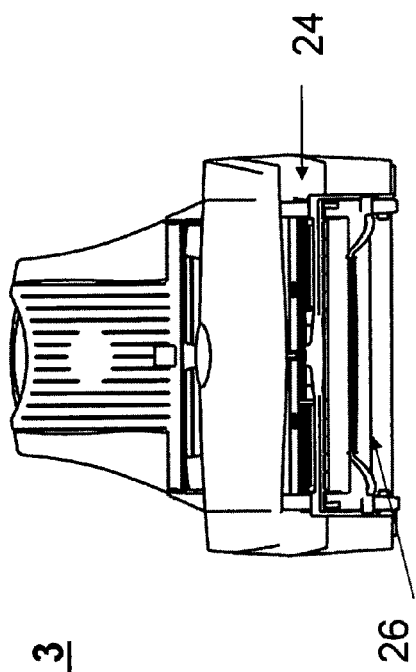
FIG. 3 is a front view of the scanner with the input tray in the use position.

FIG. 3 is a front view of the scanner which primarily helps to illustrate the configuration of the input and output areas of the front feed and document exit path wherein the top feed 24 is clearly seen to be separated from the output path while engaged in the use position.

Figure 4:
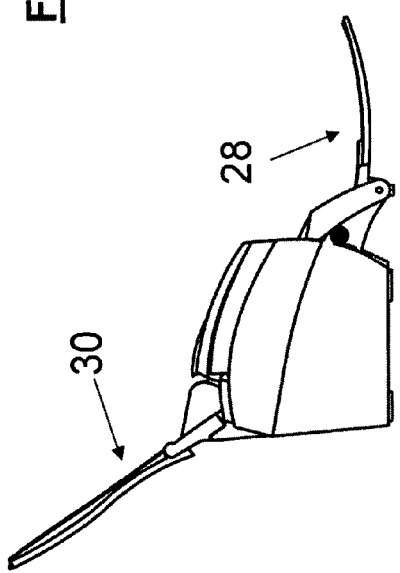
FIG. 4 is a side view of the scanner with the input tray in the use position.

FIG. 4 is a simple side view which aids in visualizing FIGS. 2 and 3 from a form perspective wherein the output tray 28 and ADF 30 are clearly outlined.

Figure 5:
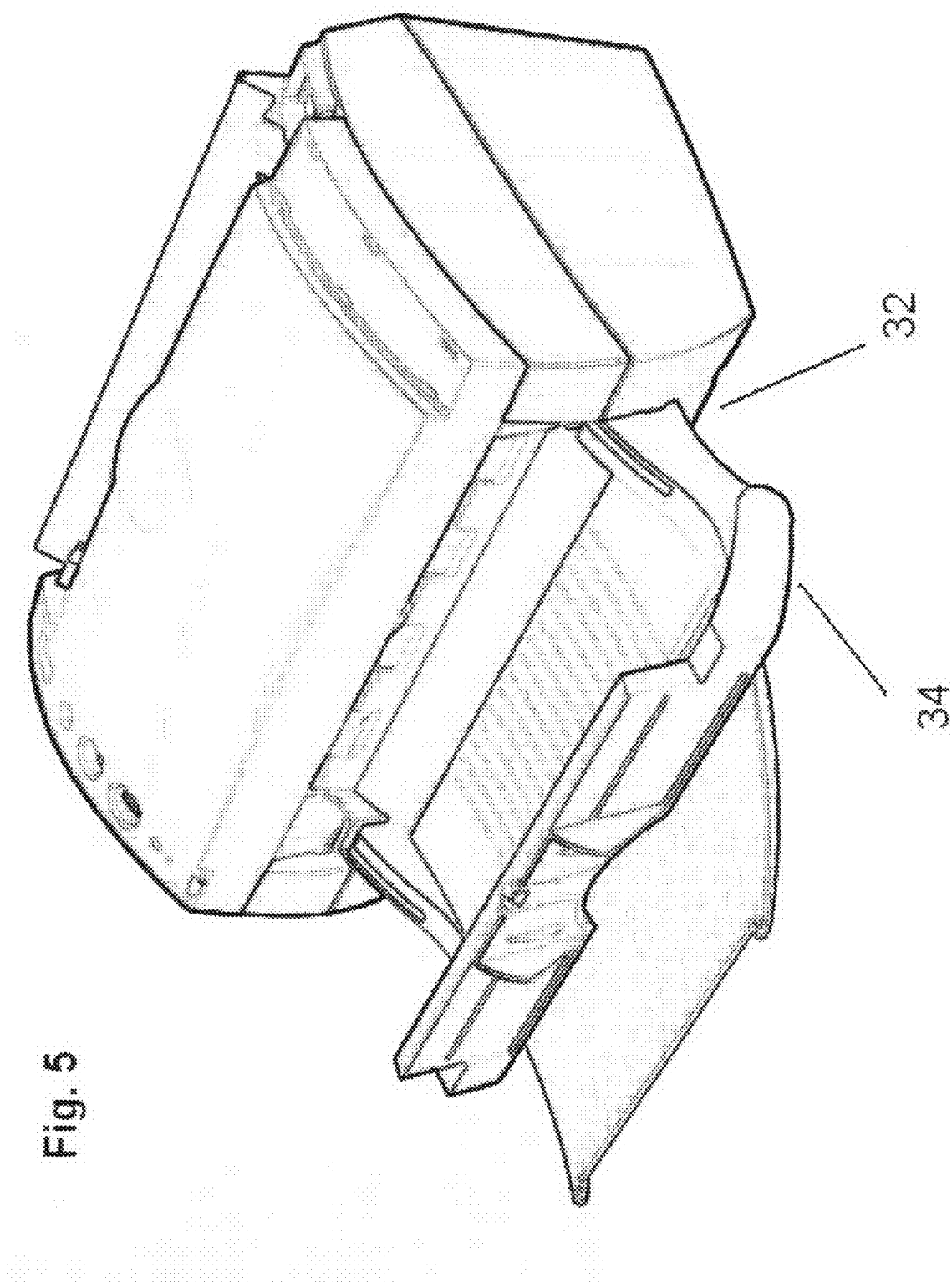
FIG. 5 illustrates the scoop form in the tray.

FIG. 5 shows the attachment method 32 of the front feed as being adapted from standard tray designs in the art, whereas the pivoting input tray 34 is attached to the existing output tray and eliminates unnecessary ancillary materials or configuration.

Figure 6:
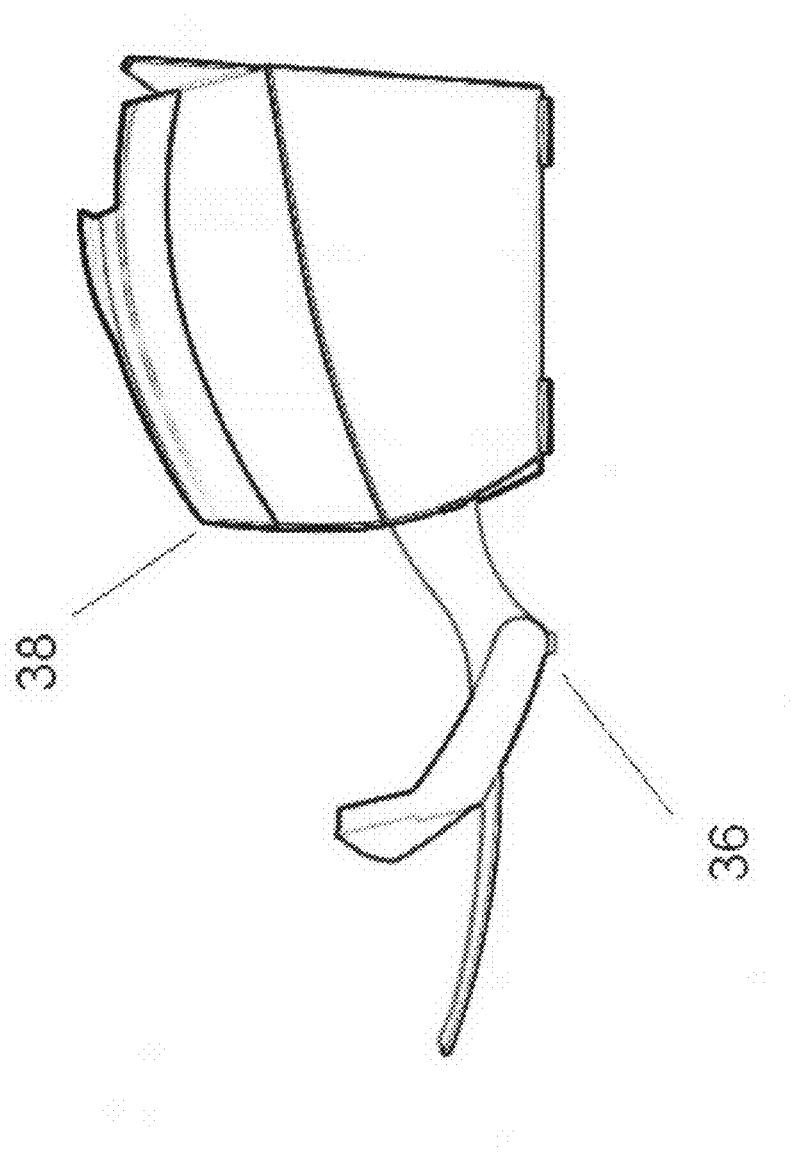
FIG. 6 shows the input tray as it pivots into maintenance position.

FIG. 6 illustrates the input tray 36 in maintenance position. Such a position allows the top of the scanner 38 to be fully opened whereby typical maintenance may be done such as clearing paper jams. The tray may be manually placed into maintenance position or it will be pushed into position by default if the scanner top is opened to clear a paper misfeed, for example.

Figure 7:
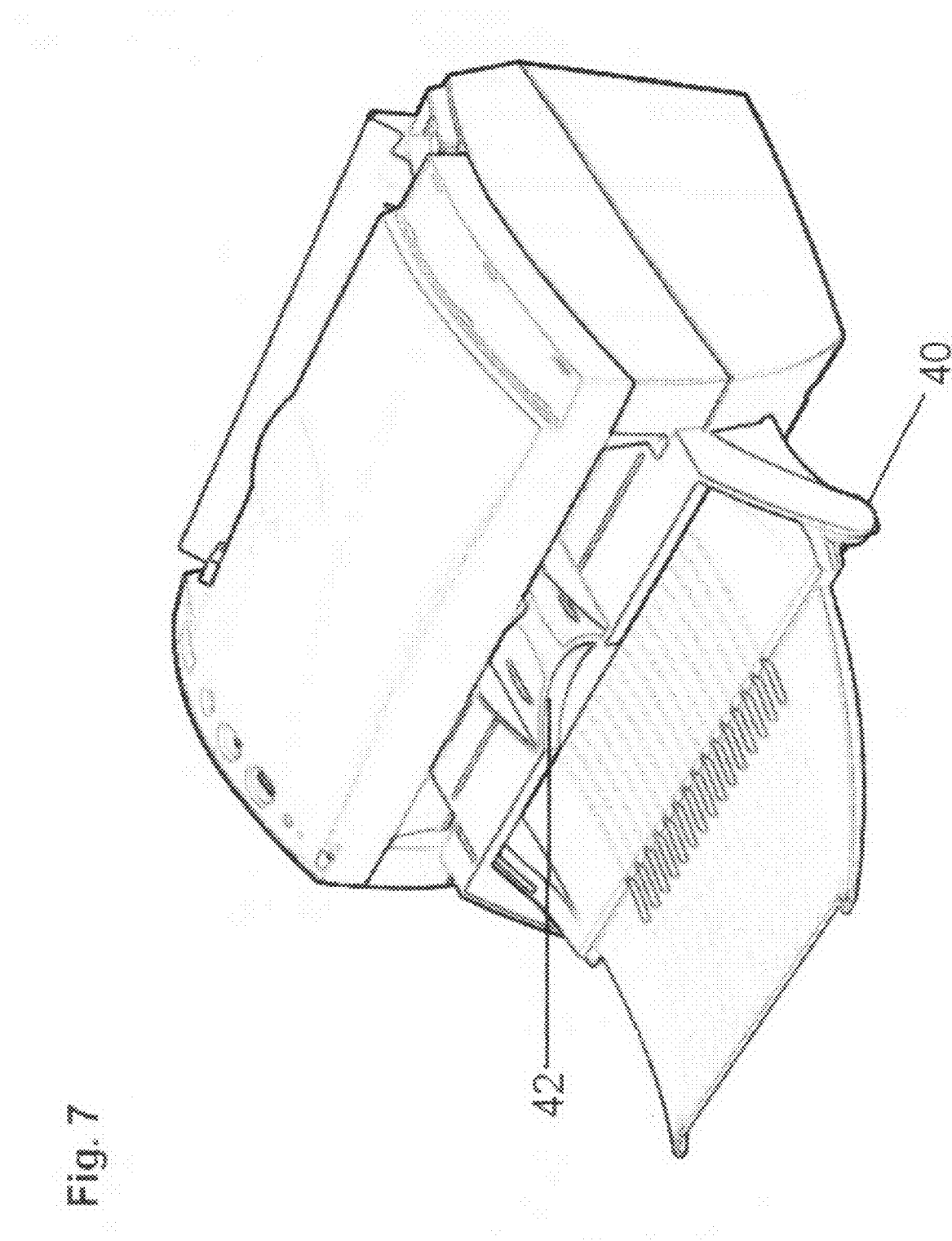
FIG. 7 illustrates the foot, ramp and pivot mechanism.

FIG. 7 shows the scanner with the input tray in the use position, but is intended to illustrate the scoop form 42 in the card portion of the tray. This configuration provides for ease of retrieval and visibility for the user when a card is present.

The paper guides 42 are not functionality affected by such a shape when expanded to accommodate wider media. Torsion springs are located behind the pivot point 40 for holding the tray in ready or home position.

Figure 8:
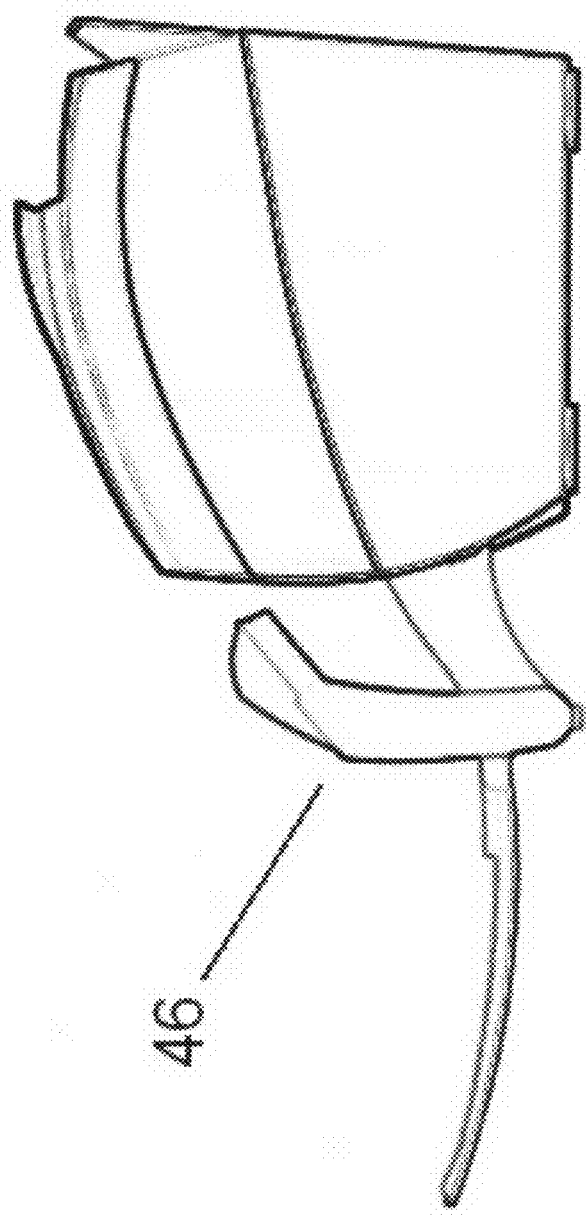
FIG. 8 is a side view of the scanner with the input tray 46 illustrated in a ready position.

FIG. 8 is a side view of the scanner with the input tray 44 illustrated in a ready position clearly not impeding the paper out put path, and unrestricting ADF functionality.

Figure 9:
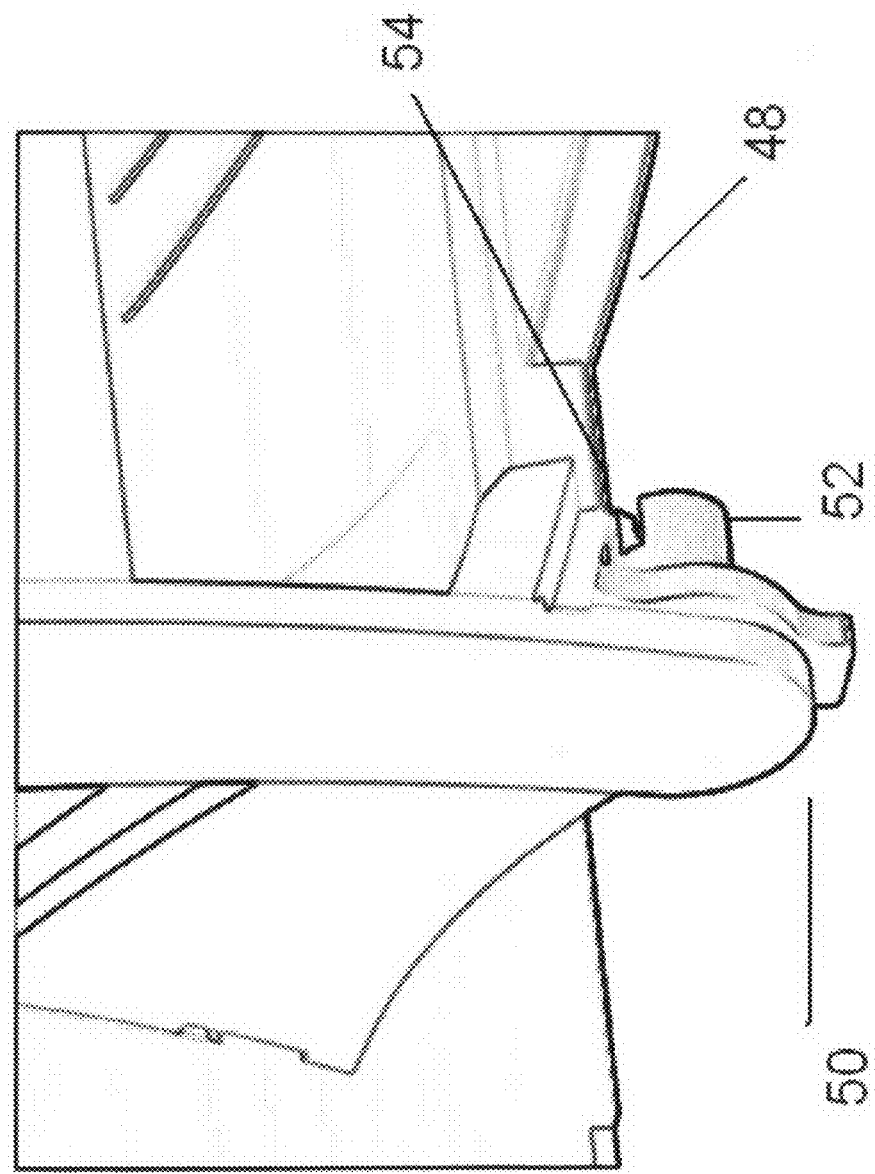
FIG. 9 is a magnified view of the foot section which resides beneath the output tray.

FIG. 9 is a magnified view of the foot section which resides beneath the output tray. The foot itself 48 connects to an axle with a slot for spring retention 50 wherein the tensioning effect insures an inward force without having to rely on the plastic housing alone to hold the pieces taut. The ramp of the output tray 46 overlays the axle and foot section slightly 52 which adds stability.

FIG. 10 illustrates a still motion capture of the tray as it can pivot into the three positions as discussed herein. The first pivot point 54 shows the tray in maintenance position which allows the scanner top to be opened to perform maintenance such as clearing paper jams. In the second pivot point, the tray is in ready position 56, and is clear of both the output path and ADF functionality. Finally, the third pivot point shows the tray in use position 58 wherein the tray aligns with the input path and a user is ready to scan media.

The invention claimed is:

1. A front feed scanner media input tray comprising:
   a) adjustable width paper guides;
   b) pivoting action for placement of the tray in use, ready, or maintenance positions;
   c) foot, ramp and axle mechanism;
   d) an output tray connected to the pivoting front feed input tray portion;
   e) and, a locking mechanism to hold the front feed input tray in a locked position.

2. A scanner input tray as in claim 1 wherein the paper guides are adjustable to widths accommodating standard 8.5× 11 inch paper to credit card or identification card widths.

3. A scanner input tray as in claim 1 wherein the tray pivots from a fixed point to either be in a use position in alignment with the scan path, a ready position, or maintenance position.

4. A scanner as in claim 1 wherein the tray use position is in alignment with the input path of the scanner or media input device.

5. A scanner input tray as in claim 1 wherein the tray ready position allows for clear output via the output tray and ADF function.

6. A scanner as in claim 1 wherein the maintenance position allows for the tray to be moved completely away from the scanner media input device to allow clearing of paper jams or similar maintenance.

7. A scanner as in claim 6 wherein maintenance position may be achieved by manual placement or automatic placement by force of opening the scanner or media input device top.

8. A scanner as in claim 1 wherein the fixed pivot point comprises a foot, axle and ramp portion which allows for mechanical movement of the front feed input tray.

9. A scanner as in claim 5 wherein the foot portion provides additional support for the output tray.

10. A scanner as in claim 4 wherein the output tray is connected to the front feed input tray.

11. A scanner as in claim 1 wherein a locking mechanism comprises torsion springs on the pivot axle or pivot point to effect locking of the input tray into ready or home positions.

* * * * *